Nov. 11, 1958     A. H. VIERGUTZ     2,859,769
FLUID FLOW REGULATING DEVICE
Filed March 25, 1953     2 Sheets-Sheet 1
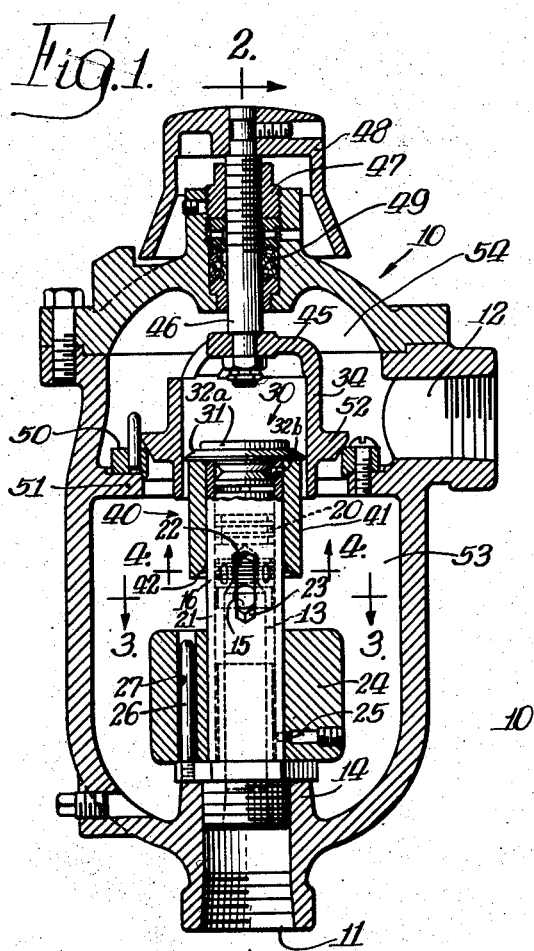
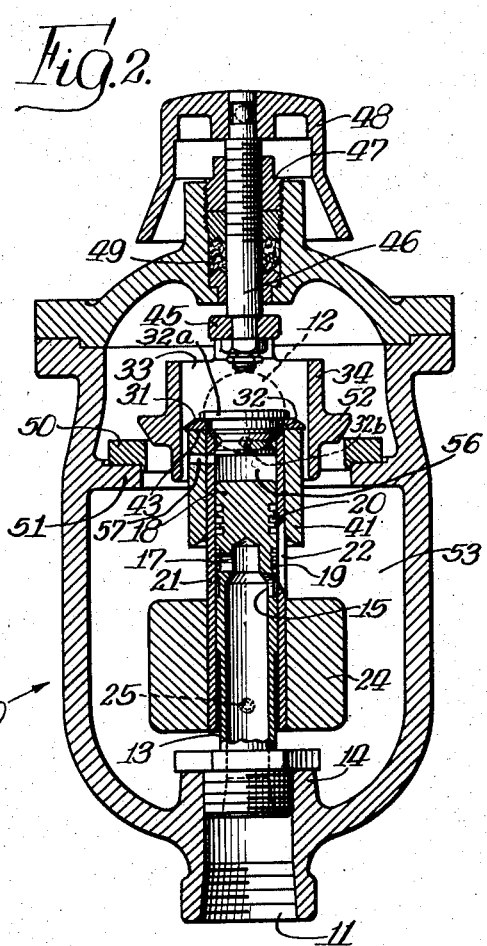
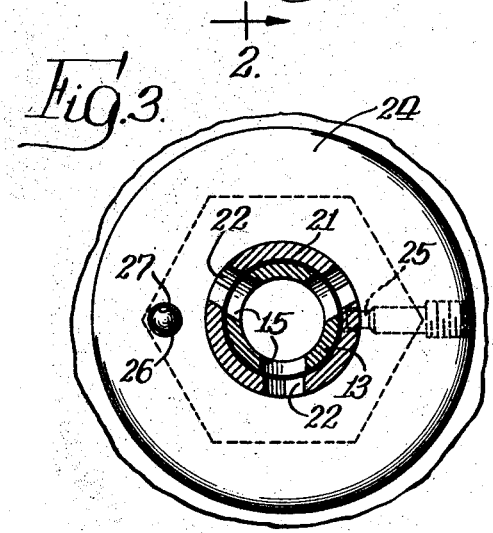
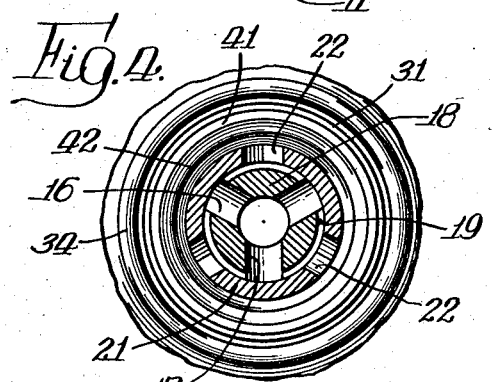
INVENTOR.
Alfred H. Viergutz,
BY
Schroeder, Merriam, Hofgren and Brady
Attys.

INVENTOR.
Alfred H. Viergutz,
BY
Schroeder, Merriam, Hofgren & Brady
Attys.

United States Patent Office 2,859,769
Patented Nov. 11, 1958

2,859,769

FLUID FLOW REGULATING DEVICE

Alfred H. Viergutz, Chicago, Ill., assignor to The W. A. Kates Company, a corporation of Illinois Application March 25, 1953, Serial No. 344,488

22 Claims. (Cl. 137—504)

This invention relates to a regulating device and more particularly to a device for regulating the flow of fluids regardless of variations in the pressure of the fluid.

It is the general object of this invention to produce a new and improved fluid flow regulating device.

Devices for regulating the flow of fluid, particularly for regulating the flow of liquids, have been in use for some time. Such devices are commonly employed in the plumbing industry where the water pressure may vary within certain limits and it is desired to regulate the flow so as to produce one which is capable of being handled by existing equipment. While such devices are often said to produce a constant flow, what is generally meant is that the devices produce a flow which does not fluctuate beyond the limits that the equipment is capable of handling. Thus flow variations from 10% to 15% do not exceed the capabilities of common plumbing equipment and a regulating device producing a flow within such limits may be considered for plumbing purposes as producing a constant flow.

Where liquid flow is to be used in an industrial process, such as in chemical processes and the like, a variation of 10% to 15% in the flow would be considered no regulation at all. In such installations the flow must be kept within 1% or 2% of a constant predetermined volume, regardless of the pressures of the liquid, in order to be usable in the system.

A fluid flow regulating device capable of maintaining the flow within limits of 1% to 2% is shown and claimed in the copending application of Williard A. Kates, Serial No. 258,939, filed November 15, 1951, now Patent No. 2,800,919, July 30, 1957. The inventions to be described herein may be considered as improvements over the devices shown in said application.

One of the principal features of the flow regulating device of the present invention is the provision of means compensating for the velocity effect of jet flow of liquids. The device shown in the drawings employs a valve means for valving off the flow of the liquid between the inlet and outlet and as the pressure increases obviously the area of the port must vary in order to produce a constant flow from the outlet. When the port is reduced in size the liquid flowing through the port emerges at an extremely high velocity which may be of the order of 100 miles per hour. The area of the valve means surrounding the port is subject to a reaction because of the velocity of the emerging jet and thus is subject to being moved by means other than the control means for controlling the valve. According to this invention there is provided a reaction equalizing member positioned to be subject to the velocity reaction of the emerging jet but in a direction generally opposite to the reaction on the area surrounding the ports and thus serving to offset the velocity reaction.

A further feature of the invention is the provision of porting means which serve to direct emerging jets toward each other so that each offsets the other more rapidly to dissipate the velocity of the stream and to convert velocity into pressure head for operating the valve.

A further feature of the invention is the provision of flow control means wherein a valve is operated by an impeller positioned in an orifice. Differential pressure across the orifice serves to move the impeller therein and thus to operate the valve means. In order to provide for precise centering of the impeller in the orifice, the same is carried for limited free movement transversely of the flow through the orifice, with such freedom of movement permitting the impeller to be self-centering. This permits a greater degree of manufacturing tolerance while assuring that the impeller is correctly positioned for proper operation of the regulating means.

Other and further features of the invention will be readily apparent from the following description and drawings, in which:

Fig. 1 is a vertical sectional view of a fluid flow regulating device embodying the invention;

Fig. 2 is a view like Fig. 1 taken approximately 90° therefrom;

Fig. 3 is a horizontal section taken along line 3—3 of Fig. 1;

Fig. 4 is a horizontal section taken along line 4—4 of Fig. 1;

Figure 5:
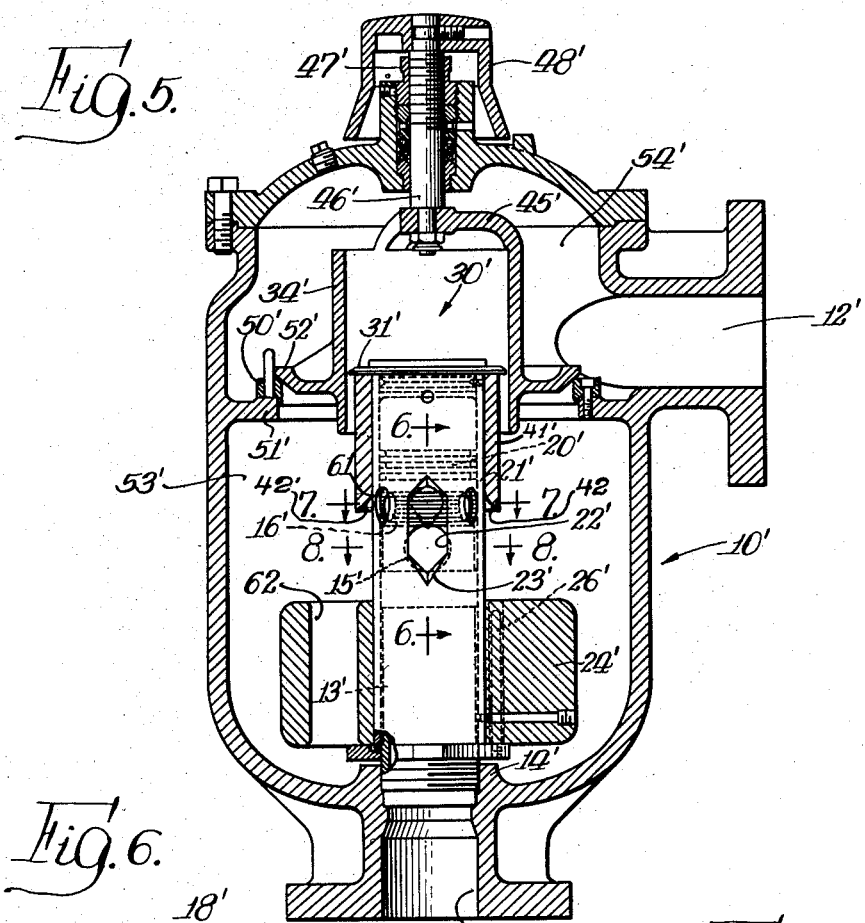
Fig. 5 is a view like Fig. 1 of a slightly modified form of the invention.
Figure 6:
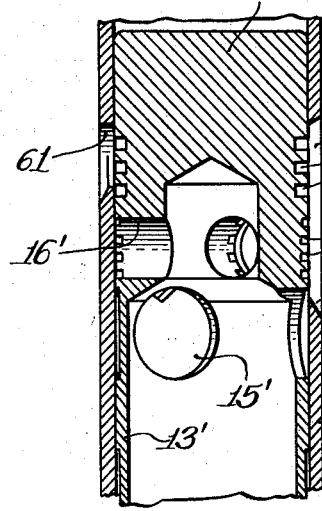
Fig. 6 is a vertical section taken along line 6—6 of Fig. 5.
Figure 7:
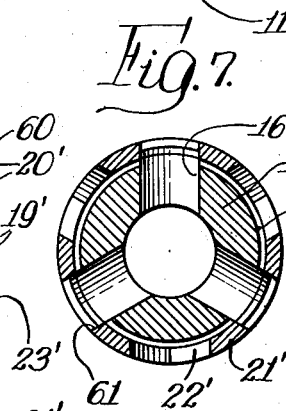
Fig. 7 is a horizontal section taken along line 7—7 of Fig. 5.
Figure 8:
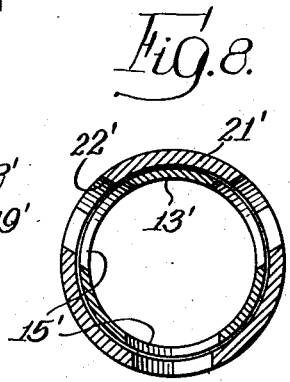
Fig. 8 is a horizontal section taken along line 8—8 of Fig. 5.

While this invention is susceptible of embodiments in many different forms, there are shown in the drawings and will herein be described in detail several embodiments, with the understanding that the present disclosure is to be considered as an exemplification of the principles of the invention and is not intended to limit the invention to the embodiments illustrated. The scope of the invention will be pointed out in the appended claims.

Referring now to Figs. 1–4 of the drawings, the device comprises a casing 10 having an inlet 11 at its bottom and an outlet 12 near its top. Within the casing a tube 13 is threaded into an integral boss 14 formed in the casing and upstands vertically therefrom. The tube is provided with a first plurality of radial openings 15 extending therethrough and a second plurality of radial openings 16 positioned thereabove. The openings 16 are longitudinally spaced from the openings 15 and angularly displaced therefrom so as to open out in directions different from those of the openings 15 and are located at the end of passages 17 drilled in the solid end 18 of the tube.

A plurality of annular grooves 19 are formed in the exterior surface of the tube and connect with each of the openings 16. Positioned above the annular groove 19 is a second plurality of grooves 20 which serve as drain grooves for liquids leaking past the first grooves.

Valve means are provided for controlling the openings 15 and 16 which, in the embodiment shown, take the form of a sleeve 21 slidably surrounding and supported by the tube. The sleeve is provided with a plurality of ports 22 radially aligned with the ports 15 when the valve is in the position shown in Fig. 1, with each of the ports 22 having a V-shaped beveled surface 23 immediately adjacent thereto. In the operation of the valve it is contemplated that the sleeve will be moved upwardly in response to increasing pressure of incoming fluid and thus serve to valve off the openings 15. It has been found that providing the V-shaped beveled surface adjacent the ports makes it possible to obtain a better balance and better flow.

The sleeve is biased to the position shown in Fig. 1 by means of a weight 24 secured thereto through the medium of a set screw 25 and the weight and hence the sleeve is restrained against rotation by means of a pin 26 secured to the boss 14 and slidably extending through an opening 27 formed on one side of the weight.

Impeller means, generally designated 30, are provided for moving the sleeve on the tube, with the impeller including an impeller disk 31 held in a recess 32 formed in a plug 32a fixed to the upper end of the sleeve by a set screw 32b. The inner diameter of the impeller disk is slightly larger than the diameter of the recess so that the impeller may move radially of itself in the recess and thus center itself in an orifice 33 formed by an upstanding annular wall 34 forming a part of a shunt valve hereinafter to be described.

When operating at high pressure with the openings 15 almost closed by the sleeve, the liquid emerging therefrom is in the form of a high velocity jet which is deflected upwardly toward the top of the casing. The area of the ports in the sleeve immediately adjacent the jets is thereby subjected to a velocity reaction tending to move the sleeve downwardly and thus interfering with the control of the impeller over movement of the sleeve. To avoid errors which would thereby appear in the device, there is provided a reaction equalizing member, generally designated 40, which is positioned to receive an opposite and substantially equal reaction from such emerging jets and thus offset the reaction on the sleeve adjacent the ports. As shown in the drawings the reaction equalizing member may take the form of a collar 41 secured to the sleeve and having a lower edge or skirt portion 42 so beveled as to be generally parallel to the bevel 23 adjacent the port. The edge or skirt portion is positioned to receive the reaction of the emerging jets which, as previously noted, are directed upwardly and thus tends to move the sleeve upwardly as contrasted to the velocity reaction on the sleeve immediately adjacent the ports which tends to move the sleeve downwardly. The upper edge 43 of the collar serves as a seat for the impeller.

A portion of the flow through the inlet is directed through the orifice 33 and in order to produce a device capable of handling more than the flow which moves through the orifice, a shunt valve is provided through which an additional portion of the fluid from the inlet may be directed to the outlet. The wall 34 forms a portion of the shunt valve and to provide for adjustment thereof, it is provided with an integral upstanding portion 45 secured to the lower end of an adjusting screw 46 which is threaded into a fitting 47 fixed to the top of the casing. The adjusting screw may be rotated by means of a hand knob 48, which knob may be suitably inscribed with gallons per minute of flow if desired. Leakage along the adjusting screw is prevented by means of a chevron seal 49 positioned to sealingly engage the top of the casing and the adjusting screw.

An annular valve seat 50 is fixed to the top surface of an inturned flange 51 formed in the casing and is adapted to sealingly engage an annular rim 52 formed on the exterior surface of the wall 34, with the rim and valve seat forming the shunt valve previously noted. Rotation of the knob 48 serves to move the shunt valve from the closed position shown in Fig. 1 to the open position shown in Fig. 2, with the shunt valve remaining stationary in whatever position to which it may be adjusted during the operation of the device.

The flanged portion 51, the shunt valve and the impeller serve to divide the casing into an inlet chamber 53 and an outlet chamber 54. The inlet chamber 53 is provided with a substantial volume so as to retain therein a sufficient quantity of fluid to absorb the velocity of incoming fluid so that no velocity effects are exerted upon the impeller means 30. The annular wall 34 also protects the impeller from velocity effect of the fluid and thus is positioned to shield the orifice from the effect of fluid flowing through the outlet compartment and into the outlet. Because of the shielding of the impeller it is subject only to pressure differentials on the inlet and outlet chamber sides thereof and its operation is not upset by velocity effects which would otherwise occur.

In operation, the inlet 11 and outlet 12 are connected into a fluid line and the hand knob 48 set to any desired total flow. At low pressure fluid entering the tube 13 is discharged through the openings 15 and ports 22 into the inlet chamber 53. With the shunt valve shown in the position in Fig. 1 all of the flow into the inlet then passes through the orifice 33 and in so doing moves by the impeller 31. It will be noted that the impeller partially obstructs flow through the orifice and hence creates a pressure differential on opposite sides thereof. If the pressure of incoming fluid is increased, greater flow through the orifice 33 results, thus increasing the pressure differential on opposite sides of the impeller. When the pressure differential is sufficient to overcome the bias of the weight 24, the sleeve 21 is moved upwardly and thus the ports in the sleeve throttle off the openings 15. This decreases the total flow through the device, retaining it at the predetermined desired volume. Further increases in pressure of the incoming fluid will raise the sleeve even higher until the ports 22 have almost completely blocked the openings 15. At this time the jets emerging from the ports 22 will have attained a relatively high velocity but any reaction effect on the sleeve surface immediately adjacent the ports is offset by the reaction equalizing member 40 so that the throttling of the openings remains solely under the control of the impeller.

When the sleeve moves upwardly a space is created between the bottom of the plug 32a and the top of the solid portion 18 of the tube forming a dashpot chamber 56. An opening 57 is provided through the side of the sleeve and the side of the collar 41 to permit drainage of fluid from the dashpot chamber. This chamber serves to dampen movement of the sleeve relative to the tube and thus reduces "hunting" of the device, and the amount of damping effect can of course be varied by varying the dimension of the opening 57.

Further increases in pressure will move the sleeve upwardly to a point where the openings 15 are completely throttled off but the ports 22 remain in communication with the annular grooves 19. As previously noted, the second openings 16 communicate with the annular grooves so that the flow to the ports 22 is through the openings 16, around the grooves to the port. Thus the fluid approaches the ports in opposite directions, the flow from each of the openings 16 being split, approximately 50% going around the grooves one way to the nearest port on one side and the balance going around in the opposite direction to the nearest port on the other side. Thus the jets emerging from the grooves are directed at each other and the velocity of one opposes the velocity of the other. The jets then emerging from the ports are, in effect, self-canceling, again to permit substantially all velocity to be absorbed within the inlet chamber 53 so that, as before, the impeller is subjected only to pressure differential and its control of the valve is solely as the result of flow through the orifice.

The port 22 is elongated longitudinally of the sleeve so as to be moved into communication with the drain grooves 20 as the sleeve moves upwardly. Fluid leaking between the sleeve and the tube is trapped in the drain grooves which, being in communication with the port, allow leakage fluid to pass therethrough and into the inlet chamber 53. As inlet pressure increases the sleeve moves upwardly on the tube and thus with increasing pressure and consequential increasing leakage, the port communicates with additional annular grooves. Increasing pressure which results in increasing throttling by the port thereby results in increasing drainage means for fluid leaking between the tube and sleeve.

The modified form of the invention shown in Figs. 5–8 is similar in many respects to that previously described and in order to avoid repeating the description the same reference numerals have been applied with a prime added.

The flow regulating device of Fig. 5 is designed to accommodate a greater volume of flow and for this purpose the sleeve 21′ is provided not only with ports 22′ but with additional openings 61 positioned to be radially aligned with the second plurality of ports 16′ formed in the sleeve. Thus at low pressures flow into the inlet chamber 53′ is through the openings 15′ and openings 16′ and a greater volume can be accommodated. Upon increase in pressure the impeller 31′ serves to move the sleeve upwardly and thus close off communication between the ports 61 and openings 16′ whereupon the device functions in substantially the same manner as that previously described. If desired, a reaction equalizing member may be provided similar to the member 40 which may be added to the sleeve 21′. Because of the large volume of flow through the openings 15′ and ports 22′ a velocity effect on the weight 24′ may sometimes be encountered. This can be expected where the top surface of the weight is closely adjacent the ports 22′ and thus the flow over the top of the weight would produce a pressure different from the static pressure of fluid on the bottom of the weight immediately below the area over which the flow from the ports passes. To prevent such velocity effects the weight may be provided with a plurality of holes 62, each positioned opposite one of the ports 22′ and obviously similar holes may be provided in the weight 24 in the embodiment previously illustrated.

I claim:

1. A fluid flow regulating device comprising a casing having an inlet and an outlet, means in the casing forming an orifice through which at least a portion of fluid entering the inlet is directed, an impeller mounted in the orifice for movement parallel to the flow therethrough, said impeller partially obstructing the flow through the orifice to create a pressure differential on opposite sides of the impeller, a port between the inlet and the outlet, a valve controlling the port, means connecting the valve to the impeller for movement therewith in one direction in response to increasing pressure differential on opposite sides of the impeller, means biasing the valve in the other direction, said valve having a portion subject to the velocity reaction of fluid flowing through the port and a reaction equalizing member connected to the valve and positioned to receive a velocity reaction from fluid flowing through the port substantially opposite to the reaction on said portion.

2. A fluid flow regulating device comprising a casing having an inlet and an outlet, means in the casing forming an orifice through which at least a portion of fluid entering the inlet is directed, an impeller mounted in the orifice for movement parallel to the flow therethrough, said impeller partially obstructing the flow through the orifice to create a pressure differential on opposite sides of the impeller, a port between the inlet and the outlet, a sleeve valve controlling the port, said sleeve valve carrying the impeller and movable therewith in one direction in response to increasing pressure differential on opposite sides of the impeller, means biasing the valve in the other direction, said sleeve valve having a portion subject to the velocity reaction of fluid flowing through the port, and a reaction equalizing member connected to the sleeve valve and positioned to receive a velocity reaction from fluid flowing through the port substantially opposite to the reaction on said portion.

3. A fluid flow regulating device comprising a casing having an inlet and an outlet, means in the casing forming an orifice through which at least a portion of fluid entering the inlet is directed, an impeller mounted in the orifice for movement parallel to the flow therethrough, said impeller partially obstructing the flow through the orifice to create a pressure differential on opposite sides of the impeller, a sleeve valve having a plurality of ports for controlling flow between the inlet and the outlet, said sleeve valve carrying the impeller and movable therewith in one direction in response to increasing pressure differential on opposite sides of the impeller, means biasing the valve in the other direction, said sleeve valve having a surface portion immediately adjacent the ports subject to the velocity reaction of fluid flowing through the ports, and a reaction equalizing member secured to the sleeve and having an annular skirt portion positioned to receive a velocity reaction from fluid flowing through said ports substantially opposite to the reaction on said surface portion.

4. A fluid flow regulating device comprising a casing having an inlet and an outlet, means in the casing forming an orifice through which at least a portion of fluid entering the inlet is directed, an impeller mounted in the orifice for movement parallel to the flow therethrough, said impeller partially obstructing the flow through the orifice to create a pressure differential on opposite sides of the impeller, a tube in the casing having its interior connected to the inlet and having a plurality of openings therethrough remote from the inlet, a sleeve slidably surrounding the tube and having a plurality of ports therein controlling the openings in the tube, said sleeve carrying the impeller and movable therewith in one direction in response to increasing pressure differential on opposite sides of the impeller, means preventing rotation of the sleeve, means biasing the sleeve in the other direction, said sleeve having a V-shaped beveled surface portion adjacent each of said ports subject to the velocity reaction of fluid flowing therethrough, and an annular collar secured to the sleeve and having an annular edge portion beveled to be generally parallel to said surface portions and positioned to receive a velocity reaction from fluid flowing through said ports substantially opposite to the reaction on said surface portions.

5. A fluid flow regulating device comprising a casing having an inlet, an outlet chamber in the casing having an outlet opening therein, an inlet chamber in the casing, means in the casing forming an orifice interconnecting the chambers, means in the outlet chamber surrounding the orifice to shield the same from the velocity effect of fluid flow in the outlet chamber, an impeller mounted in the orifice for movement parallel to the flow therethrough, said impeller partially obstructing the flow through the orifice to create a pressure differential on opposite sides of the impeller, a port connecting the inlet to the inlet chamber, said inlet chamber having a volume sufficient to cause absorption by the fluid present in the chamber of turbulence present in the incoming fluid, a valve controlling the port and connected to the impeller and movable therewith in a direction closing the port in response to increasing pressure differential on opposite sides of the impeller, means biasing the valve toward open position, said valve having a portion subject to the velocity reaction of fluid flowing through the port and a reaction equalizing member connected to the valve and positioned to receive a velocity reaction from fluid flowing through the port substantially opposite to the reaction on said portion, 6. A fluid flow regulating device comprising a casing having an inlet and an outlet, means in the casing forming an orifice through which at least a portion of fluid entering the inlet is directed, a tube in the casing having its interior connected to the inlet and having a plurality of openings therethrough remote from the inlet, a sleeve slidably surrounding the tube and having a plurality of ports therein controlling the openings in the tube, said sleeve having a V-shaped beveled surface portion adjacent each of said ports subject to the velocity reaction of fluid flowing therethrough, means preventing rotation of the sleeve, an annular collar secured to the sleeve and having an annular edge portion beveled to be generally parallel to said surface portions and positioned to receive a velocity reaction from fluid flowing through said ports substantially opposite to the reaction on said surface portion, an impeller seated on the other edge of the collar and secured to the sleeve for limited free movement transversely of the flow through the orifice, said impeller partially obstructing the orifice to create a pressure differential on opposite sides thereof and being movable parallel to the flow through the orifice in response to such pressure differential to slide the sleeve on the tube in one direction, and means biasing the sleeve in the other direction.

7. A fluid flow regulating device comprising a casing having an inlet and an outlet, means in the casing forming an orifice through which at least a portion of fluid entering the inlet is directed, a tube in the casing having its interior connected to the inlet and having a plurality of openings therethrough remote from the inlet, a sleeve slidably surrounding the tube and having a plurality of ports therein controlling the openings in the tube, said sleeve having a surface portion adjacent the ports subject to the velocity reaction of fluid flowing through the ports, means preventing rotation of the sleeve, a collar secured to the sleeve and having an annular edge portion positioned to receive a velocity reaction from fluid flowing through said ports substantially opposite to the reaction on said surface portion, an impeller seated on the other edge of the collar and secured to the sleeve for limited free movement transversely of the flow through the orifice, said impeller partially obstructing the orifice to create a pressure differential on opposite sides thereof and being movable parallel to the flow through the orifice in response to such pressure differential to slide the sleeve on the tube in one direction, and means biasing the sleeve in the other direction.

8. A fluid flow regulating device comprising a casing having an inlet, an outlet chamber in the casing having an outlet opening therein, an inlet chamber in the casing, means in the casing forming an orifice interconnecting the chambers, means in the outlet chamber surrounding the orifice to shield the same from the velocity effect of fluid flow in the outlet chamber, a port interconnecting the inlet and inlet chamber, a sleeve valve controlling the port and carrying the impeller for limited free movement transversely of the flow through the orifice, said sleeve valve being movable with the impeller in a direction closing the port in response to increasing pressure differential on opposite sides of the impeller, means biasing the valve toward open position, said valve having a portion subject to the velocity reaction of fluid flowing through the port and a reaction equalizing member connected to the valve and positioned to receive a velocity reaction from fluid flowing through the port substantially opposite to the reaction on said portion.

9. A fluid flow regulating device comprising a casing having an inlet and an outlet, means in the casing forming an orifice through which at least a portion of fluid entering the inlet is directed, a tube in the casing having its interior connected to the inlet and having a first plurality of openings therein, a plurality of annular grooves in the tube spaced from said openings, a second plurality of openings in the tube angularly and longitudinally spaced from the first openings and communicating with the grooves, a sleeve slidably surrounding the tube and having a plurality of ports radially aligned with the first openings, all of said ports establishing communication with the outlet, means preventing rotation of the sleeve, an impeller secured to the sleeve and positioned in the orifice, said impeller partially obstructing the orifice to create a pressure differential on opposite sides thereof and being movable parallel to the flow through the orifice in response to increasing pressure differential to slide the sleeve on the tube in one direction from a first position wherein the ports are aligned with the first openings in the tube toward a second position wherein said ports are out of alignment with said first openings and in communication with the grooves at a point removed from the second openings, and means biasing the sleeve in the other direction.

10. A fluid flow regulating device comprising a casing having an inlet and an outlet, means in the casing forming an orifice through which at least a portion of fluid entering the inlet is directed, a tube member in the casing having its interior connected to the inlet and having a first plurality of openings therethrough, a second plurality of openings in the tube member angularly and longitudinally spaced from the first plurality of openings, a sleeve member slidably surounding the tube member and having a plurality of ports radially aligned with the first openings, a plurality of annular grooves in one of said members and interconnecting said second openings, means preventing relative rotation between said members, an impeller secured to the sleeve and positioned in the orifice, said impeller partially obstructing the orifice to create a pressure differential on opposite sides thereof and being movable parallel to the flow through the orifice in response to increasing pressure differential to slide the sleeve on the tube in one direction from a first position wherein the ports are aligned with the first openings in the tube member toward a second position wherein said ports are out of alignment with all of the openings and communication is established between the ports and the second plurality of openings through the annular grooves, and means biasing the sleeve member in the other direction.

11. A fluid flow regulating device comprising a casing having an inlet and an outlet, means in the casing forming an orifice through which at least a portion of fluid entering the inlet is directed, a tube member in the casing having its interior connected to the inlet and having a first plurality of openings therethrough, a second plurality of openings in the tube member longitudinally spaced from the first plurality of openings, only some of which second openings are longitudinally aligned with the first openings, a sleeve member slidably surrounding the tube member and having a first plurality of ports radially aligned with the first openings and a second plurality of ports radially aligned with the second openings, a plurality of annular grooves in one of said members and interconnecting said second openings, means preventing relative rotation between said members, an impeller secured to the sleeve and positioned in the orifice, said impeller partially obstructing the orifice to create a pressure differential on opposite sides thereof and being movable parallel to the flow through the orifice in response to increasing pressure differential to slide the sleeve on the tube in one direction from a first position wherein all of the ports are aligned with the openings toward a second position wherein said ports are out of alignment with all of the openings and communicate with the grooves at a point removed from the second openings, and means biasing the sleeve in the other direction.

12. A fluid flow regulating device comprising a casing having an inlet and an outlet, means in the casing forming an orifice through which at least a portion of fluid entering the inlet is directed, a tube member in the casing having its interior connected to the inlet and having a first plurality of openings therethrough, a second plurality of openings in the tube member longitudinally spaced from the first plurality of openings, only some of which second openings are longitudinally aligned with the first openings, a sleeve member slidably surrounding the tube member and having a first plurality of ports radially aligned with the first openings and a second plurality of ports radially aligned with the second openings, a plurality of annular grooves in one of said members and interconnecting said second openings, means preventing relative rotation between said members, an impeller secured to the sleeve and positioned in the orifice, said impeller partially obstructing the orifice to create a pressure differential on opposite sides thereof and being movable parallel to the flow through the orifice in response to increasing pressure differential to slide the sleeve on the tube in one direction from a first position wherein all of the ports are aligned with the openings toward a second position wherein only the first plurality of ports are aligned with the first openings and then to a third position wherein said ports are out of alignment with all of the openings and communication is established between the first plurality of ports and the second openings through the annular grooves, and means biasing the sleeve in the other direction.

13. A fluid flow regulating device comprising a casing having an inlet, an outlet chamber in the casing having an outlet opening therein, an inlet chamber in the casing, means in the casing forming an orifice interconnecting the chambers, means in the outlet chamber surrounding the orifice to shield the same from the velocity effect of fluid flow in the outlet chamber, a port connecting the inlet to the inlet chamber, said inlet chamber having a volume sufficient to cause absorption by the fluid present in the chamber of turbulence present in the incoming fluid, an impeller mounted in the orifice for limited free movement transversely of fluid flow therethrough, said impeller partially obstructing the orifice to create a pressure differential on opposite sides thereof and being movable parallel to the flow in response to such pressure differential, a valve positioned in the casing and movable to control said port, said valve being connected to the impeller and movable therewith in a direction closing the port in response to increasing pressure differential on opposite sides of the impeller, and means biasing the valve for movement in the other direction.

14. A fluid flow regulating device comprising a casing having an inlet, an outlet chamber in the casing having an outlet opening therein, an inlet chamber in the casing, means in the casing forming an orifice interconnecting the chambers, a wall in the outlet chamber surrounding the orifice to shield the same from the velocity effect of fluid flow in the outlet chamber, a tube member in the casing having its interior connected to the inlet and having a first plurality of openings therein, a second plurality of openings in the tube member angularly and longitudinally spaced from the first plurality of openings, a sleeve member slidably surounding the tube member and having a plurality of ports radially aligned with the first openings, all of said ports opening into the inlet chamber, means preventing relative rotation between said members, a plurality of annular grooves in one of said members inter-connecting said second openings, an impeller secured to the sleeve member and positioned in the orifice, said impeller partially obstructing the orifice to create a pressure differential on opposite sides thereof and being movable parallel to the flow through the orifice in response to increasing pressure differential to slide the sleeve member on the tube member in one direction from a first position wherein the ports are aligned with the first openings in the tube member toward a second position wherein said ports are out of alignment with all of the openings and communication is established between the ports and the second plurality of openings through the annular grooves, and means biasing the sleeve member in the other direction.

15. A fluid flow regulating device comprising a casing having an inlet, an outlet chamber in the casing having an outlet opening therein, an inlet chamber in the casing, means in the casing forming an orifice interconnecting the chambers, a wall in the outlet chamber surrounding the orifice to shield the same from the velocity effect of fluid flow in the outlet chamber, a tube in the casing having its interior connected to the inlet and having a first plurality of openings therein, a plurality of annular grooves on the exterior of the tube and longitudinally spaced from the openings, a second plurality of openings in the tube communicating with the grooves and angularly displaced from the first openings, a sleeve slidably surrounding the tube and having a first plurality of ports radially aligned with the first openings, a second plurality of ports in the sleeve radially aligned with the second openings, all of said ports opening into the inlet chamber, means preventing rotation of the sleeve, an impeller secured to the sleeve member and positioned in the orifice, said impeller partially obstructing the orifice to create a pressure differential on opposite sides thereof and being movable parallel to the flow through the orifice in response to increasing pressure differential to slide the sleeve member on the tube member in one direction from a first position wherein all of the ports are aligned with the openings toward a second position wherein only the first openings are aligned with the ports and then to a third position wherein all of the ports are out of alignment with all of the openings and communication is established between the first ports and the second openings through the annular grooves, and means biasing the sleeve in the other direction.

16. A fluid flow regulating device comprising a casing having an inlet, an outlet chamber in the casing having an outlet opening therein, an inlet chamber in the casing, means in the casing forming an orifice interconnecting the chambers, a wall in the outlet chamber surrounding the orifice to shield the same from the velocity effect of fluid flow in the outlet chamber, a vertically arranged tube in the casing having its interior connected to the inlet and having a first plurality of openings therein, a plurality of annular grooves on the exterior of the tube and longitudinally spaced from the openings, a second plurality of openings in the tube communicating with the grooves and angularly spaced from the first plurality of openings, a sleeve slidably surrounding the tube and having a plurality of ports radially aligned with the first openings and opening into the inlet chamber, means preventing rotation of the sleeve, an annular collar secured to the sleeve above the ports and having an annular edge portion positioned to receive a velocity reaction from fluid flowing through said ports, an impeller secured to the sleeve and positioned in the orifice, said impeller partially obstructing the orifice to create a pressure differential on opposite sides thereof and being movable parallel to the flow through the orifice in response to increasing pressure differential to slide the sleeve upwardly from a first position wherein the ports are aligned with the first openings in the tube toward a second position wherein said ports are out of alignment with all of the openings and communication is established between the ports and the second plurality of openings through the annular grooves, and a weight secured to the sleeve to bias the same downwardly.

17. A fluid flow regulating device comprising a casing having an inlet, an outlet chamber in the casing having an outlet opening therein, an inlet chamber in the casing, means in the casing forming an orifice interconnecting the chambers, a wall in the outlet chamber surrounding the orifice to shield the same from the velocity effect of fluid flow in the outlet chamber, a vertically arranged tube in the casing having its interior connected to the inlet and having a first plurality of openings therein, a plurality of annular grooves on the exterior of the tube and longitudinally spaced from the openings, a second plurality of openings in the tube communicating with the grooves and angularly spaced from the first plurality, of openings, a sleeve slidably surrounding the tube and having a plurality of ports radially aligned with the first openings and opening into the inlet chamber, means preventing rotation of the sleeve, an annular collar secured to the sleeve above the ports and having an annular edge portion positioned to receive a velocity reaction from fluid flowing through said ports, an impeller seated on the other edge of the collar and secured to the sleeve for limited free movement transversely of the flow through the orifice, said impeller partially obstructing the orifice to create a pressure differential on opposite sides thereof and being movable parallel to the flow through the orifice in response to increasing pressure differential to slide the sleeve upwardly from a first position wherein the ports are aligned with the first openings in the tube toward a second position wherein said ports are out of alignment with all of the openings and communication is established between the ports and the second plurality of openings through the annular grooves, and a weight secured to the sleeve to bias the same downwardly.

18. A fluid flow regulating device comprising a casing having an inlet, an outlet chamber in the casing having an outlet opening therein, an inlet chamber in the casing, means in the casing forming an orifice interconnecting the chambers, a wall in the outlet chamber surrounding the orifice to shield the same from the velocity effect of fluid flow in the outlet chamber, a vertically arranged tube in the casing having its interior connected to the inlet and having a first plurality of openings therein, a plurality of annular grooves on the exterior of the tube and longitudinally spaced from the openings, a second plurality of openings in the tube communicating with the grooves and angularly spaced from the first plurality of openings, a sleeve slidably surrounding the tube and having a plurality of ports radially aligned with the first openings and opening into the inlet chamber, said sleeve having a V-shaped beveled surface portion adjacent each of the ports subject to the velocity reaction of fluid flowing therethrough, means preventing rotation of the sleeve, an annular collar secured to the sleeve above the ports and having an annular lower edge portion beveled to be generally parallel to said surface portions and positioned to receive a velocity reaction from fluid flowing through said ports substantially opposite to the reaction on said surface portions, an impeller seated on the other edge of the collar and secured to the sleeve for limited free movement transversely of the flow through the orifice, said impeller partially obstructing the orifice to create a pressure differential on opposite sides thereof and being movable parallel to the flow through the orifice in response to increasing pressure differential to slide the sleeve upwardly from a first position wherein the ports are aligned with the first openings in the tube toward a second position wherein said ports are out of alignment with all of the openings and communication is established between the ports and the second plurality of openings through the annular grooves, and a weight secured to the sleeve to bias the same downwardly.

19. A fluid flow regulating device comprising a casing having an inlet, an outlet chamber in the casing having an outlet opening therein, an inlet chamber in the casing, means in the casing forming an orifice interconnecting the chambers, means in the outlet chamber surrounding the orifice to shield the same from the velocity effect of fluid flow in the outlet chamber, a tube member in the casing having its interior connected to the inlet and having a first opening therein, a plurality of spaced second openings in the tube member each angularly and longitudinally spaced from the first opening, a sleeve member slidably surrounding the tube member and having a port opening into the inlet chamber and radially aligned with the first opening, means preventing relative rotation between said members, an annular groove in one of said members, an impeller secured to the sleeve member and positioned in the orifice, said impeller partially obstructing the orifice to create a pressure differential on opposite sides thereof and being movable parallel to the flow through the orifice in response to increasing pressure differential to slide the sleeve member on the tube member in one direction from a first position wherein the port is aligned with the first opening in the tube member toward a second position wherein said port is out of alignment with all of said openings said groove being positioned to establish communication between the port and the second openings when the tube member is in said second position, with the fluid flowing in opposite directions through said groove on either side of the port, and means biasing the sleeve member in the other direction.

20. A fluid flow regulating device comprising a casing having an inlet and an outlet, means in the casing forming an orifice through which at least a portion of fluid entering the inlet is directed, an impeller, means for mounting the impeller in the orifice for limited free movement transversely of the flow of fluid through the orifice, said impeller partially obstructing the flow through the orifice to create a pressure differential on opposite sides of the impeller, a port between the inlet and the outlet, a valve controlling the port, means connecting the valve to the impeller for movement therewith in one direction with movement of the impeller parallel to the flow through the orifice in response to increasing pressure differential, and means biasing the valve toward movement in the other direction.

21. A fluid flow regulating device comprising a casing having an inlet, an outlet chamber in the casing having an outlet opening therein, an inlet chamber in the casing, means in the casing forming an orifice interconnecting the chambers, a tube in the casing having its interior connected to the inlet and having an opening therein, a sleeve slidably surrounding the tube and having a longitudinally elongated port opening into the inlet chamber and radially aligned with the opening in the tube, an annular groove in the exterior surface of said tube above the opening in the tube, means preventing rotation of said sleeve, an impeller secured to the sleeve and positioned in the orifice, said impeller partially obstructing the orifice to create a pressure differential on opposite sides thereof and being movable parallel to the flow through the orifice in response to increasing pressure differential to slide the sleeve on the tube in a direction throttling said opening, with said port being in communication with the groove during said throttling whereby leakage between the tube and the sleeve is directed into the tube and into the inlet chamber through said port; and means biasing the sleeve in the other direction.

22. A fluid flow regulating device comprising a casing having an inlet, an outlet chamber in the casing having an outlet opening therein, an inlet chamber in the casing, means in the casing forming an orifice interconnecting the chambers, a tube in the casing having its interior connected to the inlet and having a first opening therein, a second opening in the tube longitudinally and angularly spaced from the first opening, a sleeve slidably surrounding the tube and having a longitudinally elongated port opening into the inlet chamber and radially aligned with the first opening, means preventing rotation of said sleeve, a first plurality of annular grooves formed on the exterior surface of said tube and communicating with said second opening, a second plurality of annular grooves formed on the exterior surface of the tube and longitudinally spaced from the first annular grooves, an impeller secured to the sleeve and positioned in the orifice, said impeller partially obstructing the orifice to create a pressure differential on opposite sides thereof and being movable parallel to the flow through the orifice in response to increasing pressure differential to slide the sleeve on the tube in one direction from a first position where the port is aligned with the first opening in the tube toward a second position wherein said port is out of alignment with all of said openings and communication is established between the port and the second opening through the first plurality of annular grooves, said port remaining in communication with the second plurality of grooves during said movement whereby fluid leaking between the tube and the sleeve is directed through the last mentioned grooves and port into the inlet chamber, and means biasing the sleeve member in the other direction.

References Cited in the file of this patent

UNITED STATES PATENTS

| | | |
|---|---|---|
| 635,828 | Weston | Oct. 31, 1899 |
| 1,183,541 | Dake | May 16, 1916 |
| 1,579,251 | Schossow | Apr. 6, 1926 |
| 1,907,162 | Webb | May 2, 1933 |
| 1,933,852 | Hahn | Nov. 7, 1933 |
| 2,198,487 | Sisk | Apr. 23, 1940 |